Patented July 29, 1924.

1,503,392

UNITED STATES PATENT OFFICE.

VICTOR H. TURKINGTON, OF CHICAGO, ILLINOIS, ASSIGNOR TO BAKELITE CORPORATION, OF NEW YORK, N. Y., A CORPORATION OF DELAWARE.

COLD-MOLDING PROCESS AND PRODUCT THEREOF.

No Drawing.   Application filed April 24, 1923. Serial No. 634,389.

*To all whom it may concern:*

Be it known that I, VICTOR H. TURKINGTON, a citizen of the United States, residing at Chicago, in the county of Cook and State of Illinois, have invented certain new and useful Improvements in Cold-Molding Processes and Products Thereof, of which the following is a specification.

This invention relates to phenolic condensation products, and comprises an improved process of molding said products, and the improved product resulting therefrom. My improved process is of the so-called "cold-molding" type in which the molding mixture is pressed or shaped without application of heat, or at least without application of sufficient heat to effect the transformation of the resin to its infusible state, and is thereafter baked to bring about this transformation.

In cold-molding operations as heretofore practiced it has been necessary to employ a resin which is liquid or capable of flowing at the relatively low temperatures of the mixing and shaping operations, in order that it may commingle with and impregnate the fibrous or other filler. By reason of this requirement, cold-molding operations have hitherto depended upon the employment of resins containing considerable proportions of free phenols; and this in turn has necessitated the use of correspondingly large proportions of hexamethylenetetramine or equivalent methylene-containing bodies to impart to the mixture the required potentially reactive character, and to bring about the desired transformation to the infusible state during the baking. However, both phenols and hexamethylenetetramine have a rather high vapor-pressure at the baking temperature (usually about 150° to 200° C.), and this necessarily leads to losses of these reagents, especially from the surfaces and superficial portions of the articles; and by reason of the consequent disturbance of the proper ratios of filler to binder, all such cold-molded articles have been characterized in the past by a noticeable imperfection and inferiority of surface, and a material shrinkage which may be evidenced by warping or by a change of dimensions during the baking.

According to the present invention I overcome this defect by the use, in a cold-molding operation, of a potentially reactive resin which is nearly or quite free from uncombined phenols. Such resins are hard and brittle bodies which of themselves would be quite unsuitable for cold-molding purposes: and I impart to them the necessary plasticity or flowing quality by incorporating with them a suitable proportion, usually about 30 to 50 per cent by weight of the resin, of an aldehyde of relatively high boiling point. Benzaldehyde may be used, but I preferably use furfuraldehyde (furfural) which combines the advantages of being an excellent solvent for the non-reactive and potentially reactive phenolic resins, and having a boiling point (161° C.) above that temperature at which the potentially reactive resin is normally transformed to the infusible state. Owing to the substantial absence of free phenolic bodies, and because of the non-volatility, at the hardening temperature, both of the resin and the furfural, the baking may be carried out without disturbance of the surface character and texture of the article, and without material shrinkage.

Furfural possesses another great advantage for use in connection with such potentially reactive compositions as comprise a permanently fusible phenol resin combined with hexamethylenetetramine, in that it is capable of binding the liberated ammonia as furfuramid, which may undergo further transformation under sufficient heating to the nitrogenous resinous body, furfurin. The result of its employment under the described conditions is therefore to suppress, completely or substantially, all liberation of vapors and gases from the cold-molded article during the baking stage. The articles thereby produced are superior not only in surface characteristics but in accuracy of dimension to the usual cold-molded articles; for the usual shrinkage is minimized or obviated.

The expression "potentially reactive phenolic resin" is used herein to designate all such resins and resinous compositions or mixtures as are capable of direct transformation into an infusible body under application of sufficient heat, including mixtures of the permanently fusible resins with so-called "hardening agents," such as hexamethylenetetramine and its equivalents; capable of imparting to them the potentially reactive character. The term "aldehyde" is to be regarded as including generally reactive bodies of aldehyde derivation or type, and equivalent to benzaldehyde or furfural for the purposes of this invention. Among the aldehyde bodies which may be substituted wholly or in part for furfural in the practice of this invention, I may mention such substances as benzaldehyde, hexoic aldehyde, iso-hexyl aldehyde, manno-heptose, methyl-furfural, and others of analogous character. The filling materials most commonly employed are fibrous in character, such as wood-flour, but the invention is applicable to all types of filling materials. The furfural or other high-boiling aldehyde is introduced in proportion to impart the necessary flowing quality or plasticity to the resin, this proportion of course varying widely according to the nature and proportion of the filler used. When furfural is transformed to furfuramid, we noted above, traces of water may be formed. Such traces are not as a rule objectionable, but they may be avoided if desired by incorporating in the mix a small proportion of a readily hydratable body, such as calcium oxid, $C_aO$, or the like.

One specific mixture which has proven suitable for cold-molding operations may be prepared as follows:

Into a kneading machine of the type used for mixing rubber compounds, charge 40 lbs. of finely ground asbestos, 4 lbs. of furfural, and 8 lbs. of a potentially reactive phenolic resin together with desired coloring material. The resin is first mixed with the furfural to form a liquid with a consistency similar to molasses, and this liquid is then added to the asbestos and mixing continued until the whole mass is uniform. No heat is applied during the mixing nor is the temperature due to the internal friction of mixing allowed to rise above about 70° C. The resulting mixture is ready for the cold-molding operation.

I claim:

1. The hereindescribed process of making shaped articles containing a filling material and an infusible phenol resin binder, comprising cold-molding a composition containing a filling material, a potentially reactive phenol resin, and a high boiling aldehyde capable of functioning as a solvent for the resin and a plasticizer for the mass; and thereafter heating the shaped article to a temperature sufficient to effect transformation of the potentially reactive resin, but insufficient to vaporize a material proportion of the aldehyde, whereby the transformation is accomplished without substantial shrinkage or surface alteration of the article.

2. The hereindescribed process of making shaped articles containing a filling material and an infusible phenol resin binder, comprising cold-molding a composition containing a filling material, a potentially reactive phenol resin, and furfural; and thereafter heating the shaped article to a temperature sufficient to effect transformation of the potentially reactive resin but insufficient to vaporize a material proportion of the furfural, whereby the transformation is accomplished without substantial shrinkage or surface alteration of the article.

3. A cold-molded article comprising a filling material, an infusible phenol resin, and a high-boiling aldehyde.

4. A cold-molded article comprising a filling material, an infusible phenol resin and furfural.

5. A cold-molded article comprising a filling material, an infusible phenol resin, furfural, and a nitrogenous furfural derivative.

In testimony whereof, I affix my signature.

VICTOR H. TURKINGTON.